United States Patent [19]

Brook et al.

[11] 3,892,791

[45] July 1, 1975

[54] TITANIUM COMPOUNDS

[75] Inventors: David Whiteley Brook, Teesside; Peter Dunlop Kay, Hartlepool, both of England

[73] Assignee: British Titan Limited, Teesside, England

[22] Filed: Sept. 25, 1972

[21] Appl. No.: 291,668

[30] Foreign Application Priority Data

Oct. 28, 1971  United Kingdom............... 50038/71

[52] U.S. Cl. ......... 260/429.5; 106/308 N; 260/29.6
[51] Int. Cl. .............................................. C07f 7/28
[58] Field of Search ................................. 260/429.5

[56] References Cited
UNITED STATES PATENTS

| 2,643,262 | 6/1953 | Bostwick.......................... 260/429.5 |
| 2,824,114 | 2/1958 | Bostwick...................... 260/429.5 X |
| 2,894,966 | 7/1959 | Russell............................. 260/429.5 |
| 2,920,089 | 1/1960 | Samour............................ 260/429.5 |
| 2,950,174 | 8/1960 | Lagally ........................ 260/429.5 X |
| 3,679,721 | 7/1972 | Brook et al. ..................... 260/429.5 |

OTHER PUBLICATIONS

Chemical Abstracts, Vol. 52, 6673h (1958).

*Primary Examiner*—Helen M. S. Sneed
*Attorney, Agent, or Firm*—Schuyler, Birch, Swindler, McKie & Beckett

[57] ABSTRACT

A titanium chelate which is the reaction product of a titanium orthoester, a glycol or glycol ether and an alkanolamine. The alkanolamine is specified as being diethanolamine, triethanolamine, diisopropanolamine or triisopropanolamine.

6 Claims, No Drawings

TITANIUM COMPOUNDS

This invention relates to titanium compounds and particularly to titanium chelates which are suitable for use as gelling agents, particularly in aqueous emulsion paints.

According to the present invention a titanium chelate comprises the reaction product of a titanium orthoester, a glycol or glycol ether and an alkanolamine as hereinafter defined.

By the term "alkanolamine" as used in this specification there is meant diethanolamine, triethanolamine, diisopropanolamine and triisopropanolamine.

It has been found that the chelates of the present invention prepared from a titanium orthoester, a glycol or glycol ether and an alkanolamine as hereinbefore defined or mixtures thereof are substantially water-stable and water-soluble over a wide range of composition and can be used to form gels in aqueous media and particularly in aqueous emulsion paints to produce a thixotropic paint.

Generally, the stability of the titanium chelate prepared depends on the ratio of the number of moles of Ti to the total number of moles of the glycol or glycol ether and the alkanolamine contained in the chelate and usually the higher this ratio the stronger is the gelling effect of the chelate in an aqueous emulsion paint.

Preferably, the ratio of the number of moles of the glycol or glycol ether plus the alkanolamine to the number of moles of Ti in the chelate is from 4:1 to 1:1 and more preferably 2:1 to 1.5:1. Preferably, the ratio of the number of moles of the alkanolamine to the number of moles of glycol in the chelate is from 1:5 to 10:1 and more preferably from 1:3 to 5:1.

The titanium orthoester which is employed to form the chelates according to the present invention are generally those having a formula $Ti(OR)_4$ in which the R group can be an alkyl group containing from 2 to 10 carbon atoms, preferably from 2 to 4 carbon atoms. In the general formula quoted $Ti(OR)_4$, the R groups can be the same or different. Typical examples of titanium orthoesters having this general formula are titanium tetraisopropoxide, titanium tetrabutoxide and titanium tetrahexoxide.

As stated previously, the alkanolamine is one of four named alkanolamines and mixtures of two or more alkanolamines can be used in the same chelate, if desired.

The glycols which can be used are those containing two or three free hydroxy groups or glycol ethers which can contain one or more free hydroxy groups. Typical glycols are the alkylene glycols such as ethylene glycol; 1,2-propanediol (propylene glycol); 1,3-propanediol; 1,2-butylene glycol and 2-methyl-2,4-pentanediol (hexylene glycol). Glycols containing three free hydroxy groups such as glycerol can also be used. Examples of glycol ethers are the mono alkyl ethers of ethylene glycol, diethylene glycol or triethylene glycol where the alkyl group contains 1 to 4 carbon atoms, such as 2-methoxy ethanol, 2-ethoxy ethanol, 2-isopropoxy ethanol, 2-n-butoxy ethanol. It is preferred to use a glycol which is capable of reaction with the titanium ester to form a 5- or 6- membered ring.

The chelates of the present invention can be prepared in a number of ways, for example, by mixing the glycol or glycol ether and the alkanolamine in the desired proportions followed by the addition of the titanium orthoester. Of desired, in suitable cases, either the alkanolamine or the glycol or the glycol ether can be firstly mixed with the titanium orthoester followed by the addition of the other ingredient. However, if the chelate is to be prepared from a large amount of glycol or glycol ether as compared to the alkanolamine then it is preferable to premix both the glycol or glycol ether and the alkanolamine prior to their addition to the titanium orthoester.

The reaction between the glycol or glycol ether, alkanolamine and the titanium orthoester usually is exothermic and does not require external heat being supplied. Normally, the reaction can be carried out by mixing in a suitable container and agitating until the reaction product is formed. Typically, the reaction vessel will be supplied with means to prevent the ingress of moisture during the reaction.

The chelates of the present invention are eminently suitable for use as gelling agents for aqueous emulsion paints. Such compounds consist of an aqueous emulsion of a film-forming binder of one or more suitable pigments and other paint additives. Often it is desirable to have these paints in the form of a thixotropic gel which can be broken during application of the paint to the surface. The addition of a chelate according to the present invention to an aqueous emulsion paint readily enables a gel structure to be built up which is thixotropic.

Changes naturally occur over a period of time in the actual method of manufacture of aqueous emulsions of film-forming binders and these changes whilst desirable for other reasons, can often result in a hitherto acceptable gelling agent requiring certain disadvantages when used with the new emulsions. It has been noticed that a previously acceptable gelling agent which was a titanium chelate formed from monoalkanolamine and an other alkanolamine such as triethanolamine when used with certain present day emulsions has produced a paint which has had a tendency to discolour.

The use of the chelates of the present invention has enabled an improvement in the colour to be obtained as compared to the use of a chelate formed from monoethanolamine and an other alkanolamine such as triethanolamine and also has the advantage of forming stronger gels when compared to a chelate based on alkanolamines alone.

Typical aqueous emulsions which can be used with advantage in the present invention are particularly those where cellulose ethers are used as protective colloids. Examples of such emulsions are those containing polyvinyl acetate, copolymers of vinyl acetate and acrylates, copolymers of vinyl acetate and olefines and styrene/acrylic copolymers.

When using as a gelling agent for an aqueous emulsion paint, the amount of the titanium chelate of the present invention required depends on the particular chelate being used but generally amounts within the range 0.1 to 2.0 weight per cent based on the weight of aqueous emulsion paint used can be employed.

The strength of the gel structure built up in the aqueous emulsion paint depends on the particular chelate used and its amount and the gels can be either strong or weak gels, as desired.

The invention is described in the following Examples:

EXAMPLE 1

284 grams of tetraisopropyl titanate were slowly added to 118 grams of hexylene glycol contained in a round bottomed flask fitted with a stirrer and water cooled condenser. 149 grams of triethanolamine were slowly added to the product. Heat was evolved during both additions and the final product was a titanium chelate comprising a pale yellow liquid, completely miscible in all proportions with water.

230 parts of rutile titanium dioxide, 97 parts of ground calcite, 25 parts of calcined china clay, 63 parts of a 3% aqueous solution of hydroxyethyl cellulose sold under the name Natrosol 250MR, 44 parts of a 5% aqueous solution of sodium hexametaphosphate, 185 parts of water and 11 parts of butyl cellosolve acetate were mixed together and passed through a colloid mill. To the resultant paste was added 355 parts of a commercially available vinyl acetate/2-ethyl hexyl acrylate copolymer emulsion having a 55% solids content. To the resultant paint was added 10 parts of the above titanium chelate. The product, when freshly prepared, was a free-flowing liquid which could easily be filled into containers, but on standing became a thixotropic gel.

The strength of this gel, when measured on a Boucher jelly tester, was greater than when triethanolamine titanate alone was used as the thixotropic agent.

A similarly enhanced gel strength was also obtained by adding 10 parts of a chelate consisting of the product of reaction between equimolar proportions of tetraisopropyl titanate, triethanolamine and monoethanolamine but the paint became discoloured on storage. This was particularly noticeable at the surface of the paint and could occur in less than one week from manufacture. In contrast, no discolouration was noticed in the paint containing the chelate according to the present invention, even after it had been stored for 3 months.

Similar results were obtained with other paint formulations and other commercially available colloid-stabilised emulsions.

EXAMPLE 2

Using the apparatus described in Example 1, a titanium ester chelate was prepared by adding 152 grams of propane-1,2-diol to 284 grams of tetraisopropyl titanate, followed by 112 grams of triethanolamine. The product obtained was an almost colourless mobile liquid smelling strongly of isopropanol.

205 parts of rutile titanium dioxide, 8 parts of a 25% solution of a sodium salt of a carboxylated polyelectrolyte dispersing agent sold under the name Orotan 731, 1 part of a 25% solution of 0.880 ammonia, 47 parts of a 3% solution of methyl hydroxypropyl cellulose sold under the name Methofas PM 450, 66 parts of propane-1,2-diol, 26 parts of butyl carbitol acetate and 73 parts of water were mixed together and passed through a colloid mill. To the resultant paste was added 564 parts of a commercially available vinyl acetate/acrylate copolymer emulsion other than that mentioned in Example 1, and also having a 55% solids content. To the resulting paint was added 10 parts of the titanium chelate prepared as above. The product when freshly prepared, was a free-flowing liquid, but on standing became a thixotropic gel. The strength of this gel when measured using a Boucher jelly tester was greater than when triethanolamine titanate was used as the thixotropic agent, and the paint did not discolour on storage.

A similar enhancement of gel strength was obtained by adding 10 parts of a chelate consisting of the product of reaction between equimolar proportions of tetraisopropyl titanate, triethanolamine and monoethanolamine, but such a paint was found to discolour substantially on storage.

EXAMPLE 3

Using the apparatus described in Example 1, a titanium ester chelate was prepared by slowly adding a mixture of 149 grams of triethanolamine and 31 grams of ethylene glycol to 284 grams of tetraisopropyl titanate. The product obtained was a very pale yellow mobile liquid, easily miscible with water in all proportions. It smelled strongly of isopropanol.

221 parts of rutile titanium dioxide, 81 parts of talc, 45 parts of barytes, 2 parts of a 5% solution of sodium hexametaphosphate 102 parts of a 3% solution of hydroxyethyl cellulose sold under the name Natrosol 250 MR, 164 parts of water, 9 parts of a 10% solution of 0.880 ammonia and 18 parts of butyl carbitol acetate were mixed together and passed through a colloid mill. To the resulting paste was added 330 parts of a commercially available vinyl acetate emulsion containing ethylene grafted side chains, and having a 50% solids content. To this paint was added 10 parts of the titanium chelate prepared as described above. The paint when freshly made was a free-flowing liquid which could easily be poured into cans, but on standing became a thixotropic gel. The strength of this gel was greater than that produced by triethanolamine titanate and the paint did not discolour on storage.

A similar enhancement of gel strength was obtained by adding 10 parts of a chelate consisting of the product of reaction between equimolar proportions of tetraisopropyl titanate, triethanolamine and monoethanolamine, but the paint discoloured on storage.

EXAMPLE 4

Using the apparatus described in Example 1 a titanium chelate was produced by slowly adding 284 grams of tetraisopropyl titanate to a mixture of 143 grams of triisopropanolamine and 77.5 parts of ethylene glycol. The product was obtained as a very pale yellow liquid, miscible with water to give a stable solution.

The strength of the gel produced by this compound in any of the previously described paint formulations was greater than that produced by triisopropanolamine titanate and the paints did not yellow on storage. A similar enhancement of gel strength was obtained by adding a chelate consisting of the product of reaction between equimolar proportions of tetraisopropyl titanate, triisopropanolamine and monoethanolamine but the paint discoloured on storage.

EXAMPLE 5

Using the apparatus described in Example 1 a titanium chelate was produced by slowly adding 284 grams of tetraisopropyl titanate to 191 grams of triisopropanolamine followed by the slow addition of 76 grams of propane-1,2-diol. The product was obtained as a pale yellow liquid.

The strength of the gel produced by this compound in any of the previously described paint formulations was greater than that produced by triisopropanolamine titanate and the paints did not discolour on storage.

A similar enhancement of gel strength was obtained by adding a chelate consisting of the product of reaction between equimolar proportions of tetraisopropyl titanate, triisopropanolamine and monoethanolamine, but the paint discoloured on storage.

EXAMPLE 6

Using the apparatus described in Example 1 a titanium ester chelate was produced by slowly adding 284 grams of tetraisopropyl titanate to a mixture of 166.2 grams of diisopropanolamine and 46.5 grams of ethylene glycol. The product obtained was a pale yellow liquid.

The strength of the gel produced by this compound in any of the previously described paint formulations was greater than that produced by diisopropanolamine titanate and the paints did not yellow on storage. A chelate consisting of the product of reaction between 284 grams of tetraisopropyl titanate. 166.2 grams of diisopropanolamine and 47.3 grams of monoethanolamine also produced enhanced gel strengths. However, paints containing this chelate were found to yellow on storage.

EXAMPLE 7

Using the apparatus described in Example 1 a titanium chelate was produced by slowly adding 57 grams of propylene glycol to a mixture of 284 grams of tetraisopropyl titanate and 131.2 grams of diethanolamine. The product was an almost colourless mobile liquid.

The strength of the gel produced by this compound in the paint formulations described in examples 1 and 3 was greater than that produced by diethanolamine titanate and the paints did not discolour on storage. A similar enhancement of gel strength was obtained by adding a chelate consisting of the product of reaction between 284 grams of tetraisopropyl titanate, 131.2 grams of diethanolamine and 47.3 grams of monoethanolamine. However, the latter compound caused the paint to discolour on storage.

What is claimed is:

1. A titanium chelate comprising the reaction product of a titanium orthoester having the formula Ti(OR)$_4$ in which R represents an alkyl group containing from 2 to 10 carbon atoms, an alkylene glycol containing 2 OH groups in which each alkylene group contains up to 6 carbon atoms, and an alkanolamine selected from the group consisting of diethanolamine, triethanolamine, diisopropanolamine and triisopropanolamine and in which the ratio of the number of moles of said glycol plus said alkanolamine to the number of moles of Ti in said chelate is from 4:1 to 1:1 and the ratio of the number of moles of said alkanolamine to the number of moles of said glycol is from 1:5 to 10:1.

2. A titanium chelate according to claim 1 in which the ratio is from 2:1 to 1.5:1.

3. A titanium chelate according to claim 1 in which the titanium orthoester as the formula Ti(OR)$_4$ in which R represents an alkyl group containing from 2 to 10 carbon atoms.

4. A titanium chelate according to claim 1 in which R represents an alkyl group containing from 2 to 4 carbon atoms.

5. A titanium chelate according to claim 1 in which the ratio of the number of moles of the alkanolamine to the number of moles of glycol in the chelate is from 1:3 to 5:1.

6. A titanium chelate comprising the reaction product of a titanium orthoester having the formula Ti(OR)$_4$ in which R represents an alkyl group containing from 2 to 10 carbon atoms, an alkylene glycol containing 2 OH groups in which each alkylene group contains up to 6 carbon atoms, and two or more alkanolamines selected from the group consisting of diethanolamine, triethanolamine, diisopropanolamine and triisopropanolamine and in which the ratio of the number of moles of said glycol plus said alkanolamines to the number of moles of Ti in said chelate is from 4:1 to 1:1, and the ratio of the number of moles of said alkanolamines to the number of moles of said glycol is from 1:5 to 10:1.

* * * * *